United States Patent
Thumpudi

(10) Patent No.: US 10,764,499 B2
(45) Date of Patent: Sep. 1, 2020

(54) MOTION BLUR DETECTION

(71) Applicant: Microsoft Technology Licensing, LLC, Redmond, WA (US)

(72) Inventor: Naveen Thumpudi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/625,845

(22) Filed: Jun. 16, 2017

(65) Prior Publication Data
US 2018/0367734 A1    Dec. 20, 2018

(51) Int. Cl.
| H04N 5/232 | (2006.01) |
| H04N 5/235 | (2006.01) |
| G11B 27/36 | (2006.01) |
| G06T 7/20  | (2017.01) |

(52) U.S. Cl.
CPC ........... *H04N 5/23264* (2013.01); *G06T 7/20* (2013.01); *G11B 27/36* (2013.01); *H04N 5/235* (2013.01); *H04N 5/23245* (2013.01); *H04N 5/23258* (2013.01); *G06T 2207/30244* (2013.01)

(58) Field of Classification Search
CPC ..... H04N 5/144–145; G09G 2320/106; G03B 2207/005
USPC ....... 396/55, 153; 348/208.4, 699, 169–172; 382/118
See application file for complete search history.

(56) References Cited

U.S. PATENT DOCUMENTS

| 6,144,770 A * | 11/2000 | Lennon ................ G09G 3/3629 382/232 |
| 8,063,942 B2 | 11/2011 | Hung et al. |
| 8,189,057 B2 | 5/2012 | Pertsel et al. |
| 8,964,045 B2 | 2/2015 | Shah et al. |
| 9,294,674 B2 | 3/2016 | Ozluturk |
| 2003/0081139 A1* | 5/2003 | Hofer ..................... H04N 5/235 348/362 |

(Continued)

FOREIGN PATENT DOCUMENTS

| EP | 2357614 | * | 8/2011 | ............. H04N 5/144 |
| WO | 1998034400 A1 | | 8/1998 | |

OTHER PUBLICATIONS

Damari, et al., "Motion Blur Detection", https://www.cs.bgu.ac.il/~ben-shahar/Teaching/Computational-Vision/StudentProjects/ICBV121/ICBV-2012-1-KerenDamari-BenSimandoyev/Motion Blur Detection.pdf, Published on: 2012, 6 pages.

(Continued)

*Primary Examiner* — Xi Wang
(74) *Attorney, Agent, or Firm* — Arent Fox LLP

(57) ABSTRACT

Methods and devices for compensating for detected motion when capturing an image may include determining at least one of a global movement of an imaging device and a local movement of one or more objects in a scene captured by the imaging device. The methods and devices may include comparing at least one of the global movement and the local movement to a movement threshold related to a current mode of operation of the imaging device. The methods and devices may include automatically selecting a mode of operation for the imaging device when at least one of the global movement and the local movement exceeds the movement threshold, wherein the selected mode of operation reduces blur in the captured image. The methods and (Continued)

devices may include transmitting information about the mode of operation.

20 Claims, 4 Drawing Sheets

(56) References Cited

U.S. PATENT DOCUMENTS

| | | | |
|---|---|---|---|
| 2004/0227817 A1* | 11/2004 | Oya | G06F 3/017 |
| | | | 348/155 |
| 2006/0177145 A1* | 8/2006 | Lee | G06K 9/40 |
| | | | 382/255 |
| 2007/0002145 A1* | 1/2007 | Furukawa | H04N 5/23254 |
| | | | 348/207.99 |
| 2007/0230931 A1* | 10/2007 | Nomura | G03B 7/093 |
| | | | 396/55 |
| 2008/0186386 A1* | 8/2008 | Okada | H04N 5/23248 |
| | | | 348/208.4 |
| 2009/0135270 A1 | 5/2009 | Makino et al. | |
| 2009/0231449 A1 | 9/2009 | Tzur et al. | |
| 2010/0182442 A1* | 7/2010 | Maeng | H04N 5/232 |
| | | | 348/220.1 |
| 2010/0265342 A1 | 10/2010 | Liang et al. | |
| 2011/0157379 A1* | 6/2011 | Kimura | H04N 5/23248 |
| | | | 348/208.2 |
| 2011/0292997 A1 | 12/2011 | An et al. | |
| 2012/0162449 A1 | 6/2012 | Braun et al. | |
| 2014/0003661 A1* | 1/2014 | Kwon | H04N 5/23293 |
| | | | 382/103 |
| 2015/0016683 A1 | 1/2015 | Kinoshita | |
| 2015/0116516 A1 | 4/2015 | Ozluturk | |

OTHER PUBLICATIONS

Shah, et al., "Automated Blur Detection and Removal in Airborne Imaging Systems Using Imu Data", In Journal of International Archives of the Photogrammetry, Remote Sensing and Spatial Information Sciences, vol. 39, Aug. 25, 2012, pp. 321-323.

"International Search Report & Written Opinion Issued in PCT Application No. PCT/US2018/033577", dated Aug. 13, 2018, 12 Pages.

* cited by examiner

MOTION BLUR DETECTION

BACKGROUND

The present disclosure relates to image and video capture.

When a user is taking a picture of a subject and the subject is moving when the picture is taken, the resulting picture may be blurry and/or out of focus due to the movement of the subject. Generally, in order to compensate for motion of a subject in a picture, a user may make adjustments to the shutter speed prior to capturing the image to reduce the blur that may occur in an image due to the motion. In addition, when a user is taking a picture, there may be unwanted movement of the camera because the hand(s) of the user may be shaking or the user may be walking. As such, when the user takes the picture, the resulting picture may be blurry and/or out of focus due to the movement of the user.

Thus, there is a need in the art for improvements in image capture.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The operating system may be operable to determine at least one of a global movement of an imaging device and a local movement of one or more objects in a scene captured by the imaging device; compare at least one of the global movement and the local movement to a movement threshold related to a current mode of operation of the imaging device; automatically select a mode of operation for the imaging device when at least one of the global movement and the local movement exceeds the movement threshold, wherein the selected mode of operation reduces blur in the captured image; and transmit information about the mode of operation.

Another example implementation relates to a method for compensating for detected motion when capturing an image. The method may include determining, by an operating system on a computer device, at least one of a global movement of an imaging device and a local movement of one or more objects in a scene captured by the imaging device. The method may include comparing at least one of the global movement and the local movement to a movement threshold related to a current mode of operation of the imaging device. The method may also include automatically selecting a mode of operation for the imaging device when at least one of the global movement and the local movement exceeds the movement threshold, wherein the selected mode of operation reduces blur in the captured image. The method may include transmitting information about the mode of operation.

Another example implementation relates to computer-readable medium storing instructions executable by a computer device. The computer-readable medium may include at least one instruction for causing the computer device to determine at least one of a global movement of an imaging device and a local movement of one or more objects in a scene captured by the imaging device. The computer-readable medium may include at least one instruction for causing the computer device to compare at least one of the global movement and the local movement to a movement threshold related to a current mode of operation of the imaging device. The computer-readable medium may include at least one instruction for causing the computer device to automatically select a mode of operation for the imaging device when at least one of the global movement and the local movement exceeds the movement threshold, wherein the selected mode of operation reduces blur in the captured image. The computer-readable medium may include at least one instruction for causing the computer device to transmit information about the mode of operation.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for detecting motion when capturing an image using an imaging device and compensating for the detected motion in the resulting image by reducing blur in the resulting image. The devices and methods may automatically select different modes of operation for the imaging device based on the detected global movement of an imaging device (e.g., movement of the imaging device) and/or local movement of a scene being captured by the imaging device (e.g., detected motion in the scene).

The motion of the imaging device may be detected, for example, based on data (e.g., sensor data) received from one or more inertial measurement units (IMUs), such as, but not limited to, a gyroscope, an accelerometer, a magnetometer, and/or a global positioning system. In addition, the motion in the scene may be detected through a scene analysis of the pixels in a preview image to determine whether a subject is moving in the scene and/or a location of the detected movement. The scene analysis may further determine where movement may be acceptable in an image. For example, movement in peripheral areas of the image may be acceptable, while movement in the center of the image may be undesirable. In addition, the scene analysis may determine whether the image is being captured in a low light condition and/or can benefit from high dynamic range imaging.

The devices and methods may automatically select a mode of operation of an imaging device based on the received motion of the imaging device and/or detected motion in the scene. For example, the devices and methods may automatically adjust the shutter speed of an imaging device based on the received motion information. There may be one or more tolerance thresholds or ranges of detected motion associated with respective shutter speeds available for selection. In addition, the devices and methods may provide notifications to the user and/or camera driver based on the detected motion. The notifications to the camera driver may include, for example, a proposed shutter speed and a range of exposure. The notifications to the user may also include, for example, a warning that motion has been detected, one or more proposed shutter speeds, and/or one or more ranges of exposure for which a user selection may be received for use in taking the picture. The movement information may also be used to trigger video recording instead of capturing a single image frame.

When motion is detected when capturing an image, either from the movement of the imaging device and/or the subject of the image moving, the devices and methods may compensate for the detected motion in the resulting image by reducing the blur in the resulting image. As such, the devices and methods may produce crisper images and/or triggering video capture instead.

Figure 1:
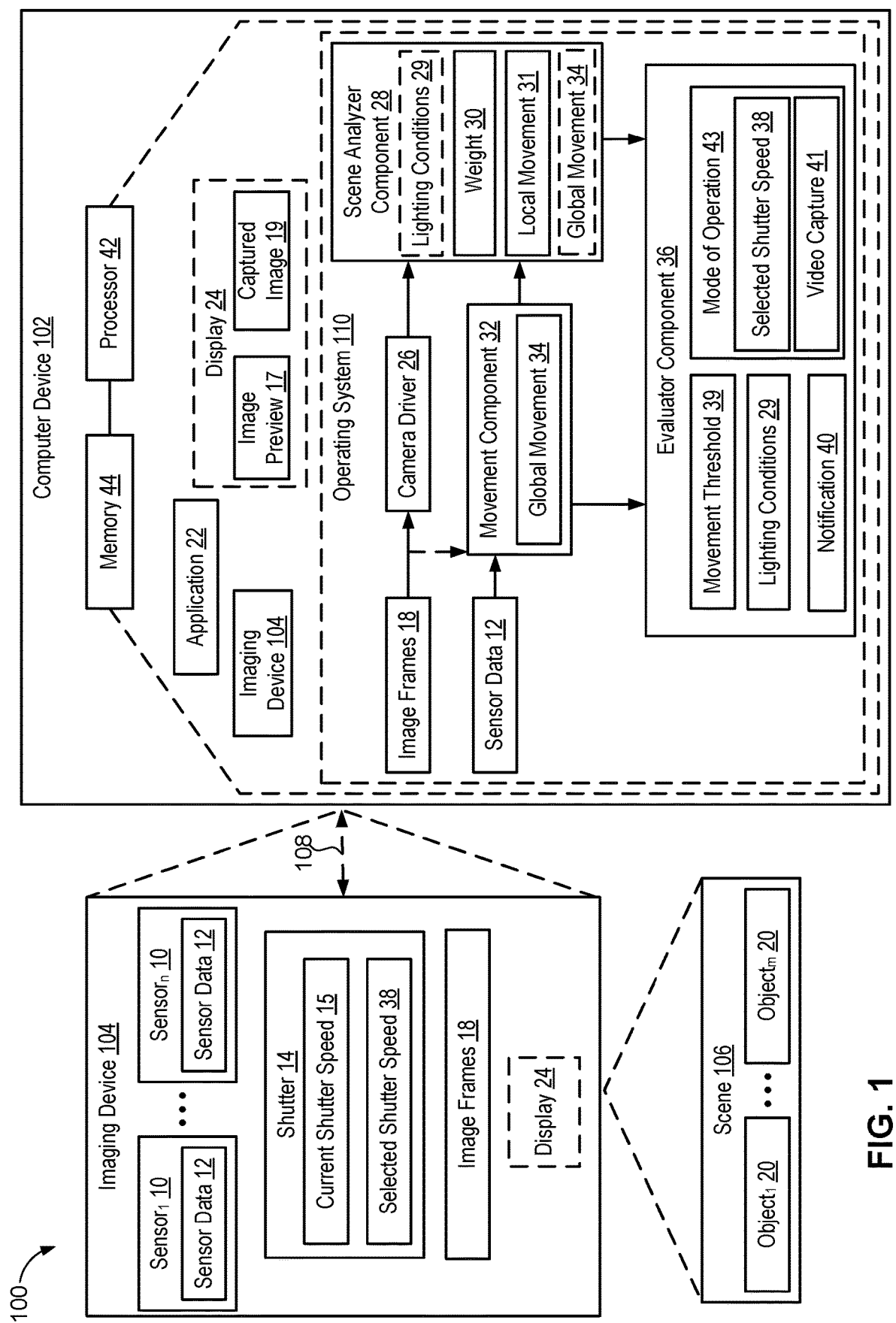
FIG. 1 is a schematic block diagram of an example computer device in accordance with an implementation of the present disclosure.

Referring now to FIG. 1, an example system 100 for compensating for detected motion when capturing an image of a scene 106 may include a computer device 102 with one or more applications 22 executed or processed by processor 42 and/or memory 44 of computer device 102. Applications 22 may want to use one or more imaging devices 104 on computer device 102 and/or in communication with computer device 102 via a wired or wireless connection 108 to capture a scene 106.

Imaging device 104 may capture a video and/or still picture of scene 106 that may be presented on a display 24. Display 24 may be located on computer device 102 and/or a device remote to computer device 102. Imaging device 104 may capture one or more image frames 18 of a plurality of objects up to m objects (where m is a positive number) of scene 106.

Imaging device 104 may include one or more sensors 10 (up to n sensors, where n is a positive number) that may produce sensor data 12 of the imaging device 104. The one or more sensors 10 may include one or more inertial measurement units (IMUs), such as, but not limited to, a gyroscope, an accelerometer, a magnetometer, and/or a global positioning system (GPS). In an implementation, when the imaging device 104 is remote from computer device 102, the sensor data 12 may be transmitted to computer device 102 via a wired or wireless connection 108.

Computer device 102 may include an operating system 110 executed by processor 42 and/or memory 44 of computer device 102. Memory 44 may be configured for storing data and/or computer-executable instructions defining and/or associated with operating system 110, and processor 42 may execute operating system 110. An example of memory 44 can include, but is not limited to, a type of memory usable by a computer, such as random access memory (RAM), read only memory (ROM), tapes, magnetic discs, optical discs, volatile memory, non-volatile memory, and any combination thereof. An example of processor 42 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

In an implementation, operating system 110 may include a camera driver 26 that receives image frames 18 from imaging device 104 and that allows interaction between imaging device 104 and operating system 110. Camera driver 26 may be a device driver that operates or controls a particular type of imaging device 104. In some examples, camera driver 26 may provide a software interface to the hardware of the imaging device 104, enabling the operating systems 110 and other computer programs to access the hardware functions without needing to know precise details of the hardware. For instance, the data of image frames 18 may be in the form of a series of image frames 18 received from imaging device 104. The series of image frames 18 may be provided at a certain frame rate. For example, the frame rate may be determined by the configuration of the device and the prevailing lighting conditions. Accordingly, camera driver 26 may provide the image frames 18 to operating system 110 in the form of the series of image frames 18.

Computer device may also include a movement component 32 that determines the global movement 34 of imaging device 104. The global movement 34 may include any movement of the imaging device 104. The global movement 34 may be based on the sensor data 12 received from imaging device 104 and/or a pixel analysis of the image frames 18. For example, if the hands of a user are moving slightly when holding the imaging device 104, the sensor data 12 may indicate an amount of detected movement for the imaging device 104. In addition, the movement component 32 may analyze the pixels of image frames 18 to determine the global movement 34 of imaging device 104. As such, the global movement 34 may be based on the amount of detected movement by one or more sensors 10 and/or a pixel analysis of the image frames 18. In an implementation, the global movement 34 may be provided as Inertial Measurement Unit parameters, such as, but not limited to, changes in pitch, roll, and yaw, as translation, zoom-in/zoom-out, and/or two dimensional (2-D) or three dimensional (3-D) affine transform coefficients.

In addition, computer device 102 may include a scene analyzer component 28 that may analyze the pixels in the image frames 18 to determine a local movement 31 of scene 106 based on detected movement in scene 106. The local movement 31 may include any detected motion in the scene 106 captured by the imaging device 104. For example, scene analyzer component 28 may determine whether any objects 20 may be moving in the scene 106 and/or a location of the detected movement. Scene analyzer component 28 may further determine where movement may be acceptable in an image. For example, movement in peripheral areas of the image may be acceptable, while movement in the center of the image may be undesirable. In an implementation, the scene analyzer component 28 may perform both global and local motion analysis as an optimization, when pixel analysis may be the only available mechanism. As such, the scene analyzer component 28 may determine both the local movement 31 of objects 20 in the scene 106 and the global movement 34 of the imaging device 104.

Figure 2:
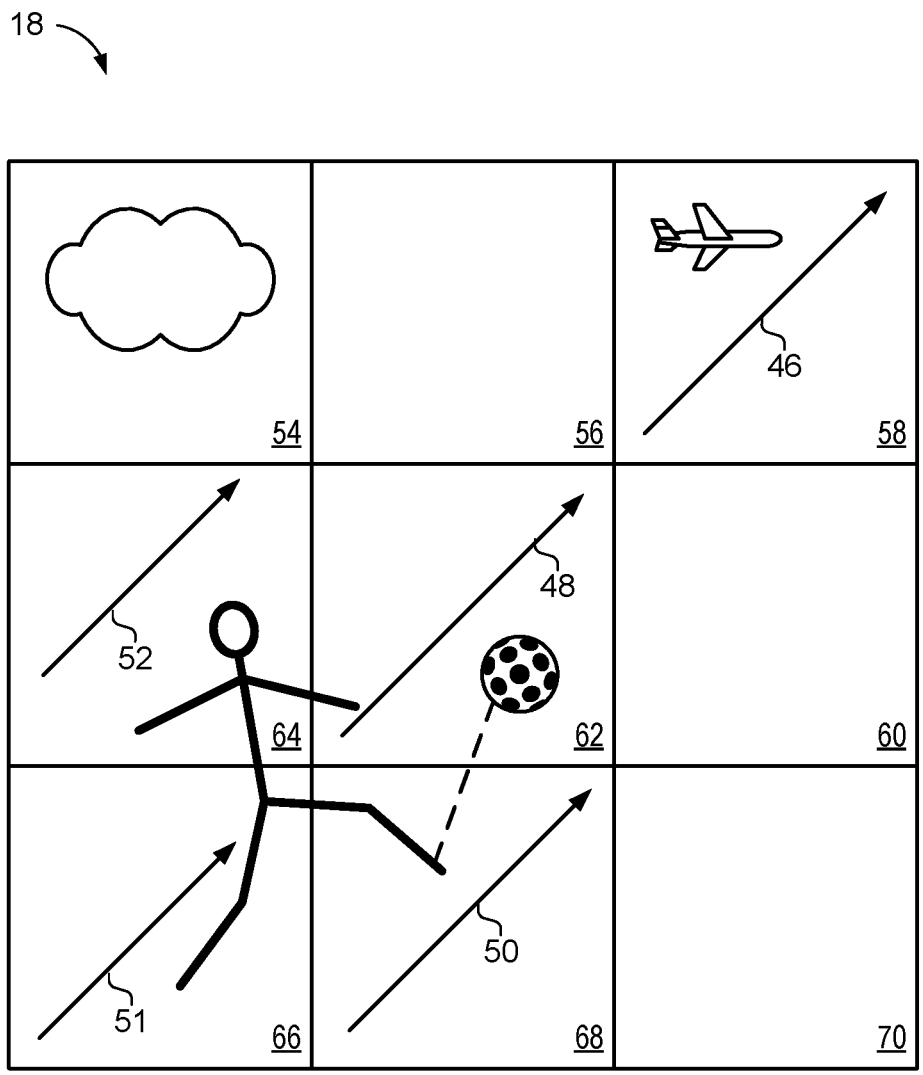
FIG. 2 is a schematic block diagram of an example scene analysis in accordance with an implementation of the present disclosure.

Referring now to FIG. 2, illustrated is an example scene analysis performed by scene analyzer component 28 (FIG. 1) to analyze the pixels of an image frame 18 of scene 106 to determine whether any motion may be occurring by one or more objects 20 in the scene 106. For example, scene 106 may be of a child playing soccer outside. Image frame 18 may be a preview image 17 (FIG. 1), for example, presented in display 24 (FIG. 1) prior to capturing and saving an image of scene 106.

In the illustrated example, scene analyzer component 28 may partition the image frame 18 into nine different portions: section 54, section 56, section 58, section 60, section 62, section 64, section 66, section 68, and section 70. There may be one or more objects 20 of scene 106 captured in the respective sections. For example, sections 62, 64, 66, and 68 may include a child kicking a soccer ball, section 54 may include a cloud, and section 58 may include an airplane flying.

Scene analyzer component 28 may analyze the pixels in the image frames 18 and may detect motion (illustrated by arrows 46, 48, 50, 51, and 52) in sections 58, 62, 64, 66, and 68 of scene 106. Scene analyzer component 28 may use a variety of motion detection and motion estimation methods to detect motion of scene 106, including, but not limited to, block-matching methods, phase correlation methods, frequency domain methods, pixel recursive methods, and/or optical flow based approaches. In an implementation, scene analyzer component 28 may use the global movement 34 estimate, when available as a starting point for determining the local movement 31 and may refine locally through pixel analysis, or scene analyzer component 28 may ignore the global movement 34 estimate completely and perform the local movement 31 motion estimation. Unlike video compression or other use cases, high precision motion estimation may not be needed for the purposes of camera mode selection. Accordingly, the motion analysis may not be performed each frame, and may be performed infrequently, e.g., five times a second. Moreover, lower resolution frames may be analyzed instead of full fidelity input frames, e.g. 320×240 sized representation while the imaging device 104 may be generating frames at 1280×720 or 1920×1080 resolution.

Scene analyzer component 28 may select a weight 30 (FIG. 1) for each of the detected areas of motion. In an implementation, scene analyzer component 28 may hard code weight 30, where each weight 30 may indicate a relative importance of regions in the field of view. For example, scene analyzer component 28 may scale the weights based on a location of the motion relative to a location of the center of the image frame 18. For instance, scene analyzer component 28 may apply a lower weight for the detected motion 46 of the airplane flying in section 58 relative to the detected motion 48, 50, 51, and 52 in sections 62, 64, 66, and 68 because the airplane is flying in a peripheral area of the scene 106. Moreover, scene analyzer component 28 may apply a higher weight for the detected motion 48, 50, 51, and 52 because the motion is closer toward the center of the image. The weights 30 may be spatially varying. For example, the weights 30 may transition smoothly from the center to the edge of the field of view, or be more discrete values of one per tile with a field of view divided into a plurality of tiles, such as, but not limited to, 3×3 tiles, 4×3 tiles, and 16×9 tiles. FIG. 2 illustrates an example field of view divided into 3×3 tiles.

As such, scene analyzer component 28 may apply various weights 30 to the detected motion 46, 48, 50, 51, and 52 based on a location of the detected motion 46, 48, 50, 51, and 52, and/or based on features in the sections of the image frame 18 having the motion, and may use the various weights 30 in determining the local movement 31 (FIG. 1) of scene 106.

Referring back to FIG. 1, scene analyzer component 28 may also determine the lighting conditions 29 of scene 106. For example, scene analyzer component 28 may determine whether the preview image 17 is being captured in a low light condition and/or may benefit from high dynamic range imaging. As such, scene analyzer component 28 may use additional features, such as, but not limited to, lighting conditions 29 and/or high dynamic range imaging, in combination with any weights 30 applied to detect movement of objects 20 in scene 106 in determining a local movement 31 of scene 106.

Evaluator component 36 may receive the global movement 34 information and/or the local movement 31 information and may compensate for the detected motion by selecting a mode of operation 43 for imaging device 104 based on the received movement information. For example, evaluator component 36 may evaluate the detected motion (e.g., the global movement 34 and/or the local movement 31) and may determine whether the detected motion is within a movement threshold 39 for the current mode of operation of the imaging device 104. The movement threshold 39 may allow for a minimum amount of movement before a captured image 19 may become blurry using the current mode of operation of the imaging device 104. For example, imaging device 104 may be stationary (e.g., on a tripod) while taking pictures of a sports team playing a game. As such, evaluator component 36 may determine that there is only local movement 31 (e.g., the sports teaming playing the sport) and no global movement 34 of the imaging device 104. In another example, the hands of a user may be shaking slightly while taking a picture of a car driving by, as such, evaluator component 36 may determine that there is both global movement 34 (e.g., imaging device movement from the hands shaking) and local movement 31 (e.g., the car driving). Another example may include a user moving slightly while taking a picture of a building, and evaluator component 36 may determine that there is global movement 34 of the imaging device (e.g., based on the movement of the user) while there is no local movement 31 of the scene 106.

The movement thresholds 39 may vary and may be modified for a targeted system and/or for a desired outcome. In one implementation, global movement 34, such as hand jitter of few degrees (e.g., a rotation of within 5 degrees per second) may be treated as no movement or noise, while rotations of 6 to 24 degrees per second may be treated as moderate movement, while rotations of higher than 25 degrees per second may be treated as large movement. In one implementation, local movements 31 of less than 3% of region dimension (e.g., a tile width or tile height) per second may be considered no movement, local movements 31 of 4-7% of region dimension per second may be treated as moderate movement, while local movements 31 more than 8% per second may be treated as large movements. Similar scales may be used for global translational movements of imaging device 104.

If the detected motion is within the movement threshold 39 for the current mode of operation of the imaging device 104, evaluator component 36 may not need to compensate for the detected motion. For example, if there is no local movement 31 (e.g., the objects 20 in scene 106 are stationary) and the global movement 34 of the imaging device is minimal, the detected motion may be within the movement threshold 39 for the current shutter speed 15 and the resulting captured image 19 may not be blurry. However, if the detected motion exceeds the movement threshold 39 for the mode of operation of the imaging device 104, evaluator component 36 may compensate for the detected motion by selecting a mode of operation 43 of imaging device 104 that can obtain a clear picture under the detected motion condition. Evaluator component 36 may also evaluate the lighting conditions 29 of the scene 106 when selecting the mode of operation 43 for imaging device 104.

For example, evaluator component 36 may automatically select a shutter speed 38 for imaging device 104 based on at least one of the global movement 34, the local movement 31, and/or the lighting conditions 29 of the scene 106. The selected shutter speed 38 may be a shutter speed that may produce a clear picture with the detected amount of motion. For example, the selected shutter speed 38 may be a faster shutter speed relative to the current shutter speed 15 to compensate for the local movement 31 and/or global movement 34. In general, there may be a trade-off between shutter speed (or exposure), and noise in the resulting image. If the lighting conditions 29 are good, then for a scene with movements, evaluator component 36 may select to use a faster shutter speed and a low noise image or video may be produced. However, if the lighting conditions 29 are poor (e.g., low light), then using a faster shutter speed may produce a noisy image. As such, when lighting conditions 29 are poor, evaluator component 36 may select a multi-frame low noise capture as the mode of operation 43.

In addition, the evaluator component 36 may select video capture 41 based on at least one of the global movement 34, the local movement 31, and/or the lighting conditions 29 of the scene 106. The movement information, and in particular, the local movement 31, may be used to trigger video recording instead of capturing a single frame. Video recordings may produce "living images", "cliplets", animated GIFs, etc., that may be more appealing to a user than a blurry single image.

Evaluator component 36 may transmit a notification 40 with the selected mode of operation 43 to a user and/or a camera driver based on the global movement 34 and/or the local movement 31. The notification 40 to the camera driver may include, for example, a selected shutter speed 38 and/or a range of exposure. In addition, the notifications to the user may include, for example, a warning that motion has been detected, one or more proposed shutter speeds, and/or one or more ranges of exposure for which a user selection may be received for use in taking the picture.

In an implementation, evaluator component 36 may also determine that a flash or screen beacon on imaging device 104 should be enabled based on the global movement 34 and/or the local movement 31 so that lighting is improved (and faster shutter speeds may be possible without resulting in objectionable capture noise). As such, the notification 40 may also indicate a mode of operation 43 to enable a flash or screen beacon on imaging device 104.

In an implementation, evaluator component 36 may determine a strength of Temporal Denoising (also called Temporal Noise Reduction) on the video, along with the shutter speed. In general faster shutter speeds may imply a need for temporal denoising.

Imaging device 104 may receive the selected mode of operation 43 and may automatically switch to the selected mode of operation 43 to capture an image 19. Imaging device 104 may receive the selected shutter speed 38 and may automatically switch to the selected shutter speed 38 to capture an image 19 of scene 106. By using the selected shutter speed 38, the amount of blur in the captured image 19 may be reduced. As such, a crisper image may be produced by imaging device 104.

In addition, if video capture 41 is selected by evaluator component 36, as the mode of operation 43, notification 40 may include the proposal to use video capture 41 instead of a single image capture. As such, imaging device 104 may automatically switch to video capture instead of a single image capture mode upon receiving notification 40.

Figure 3:
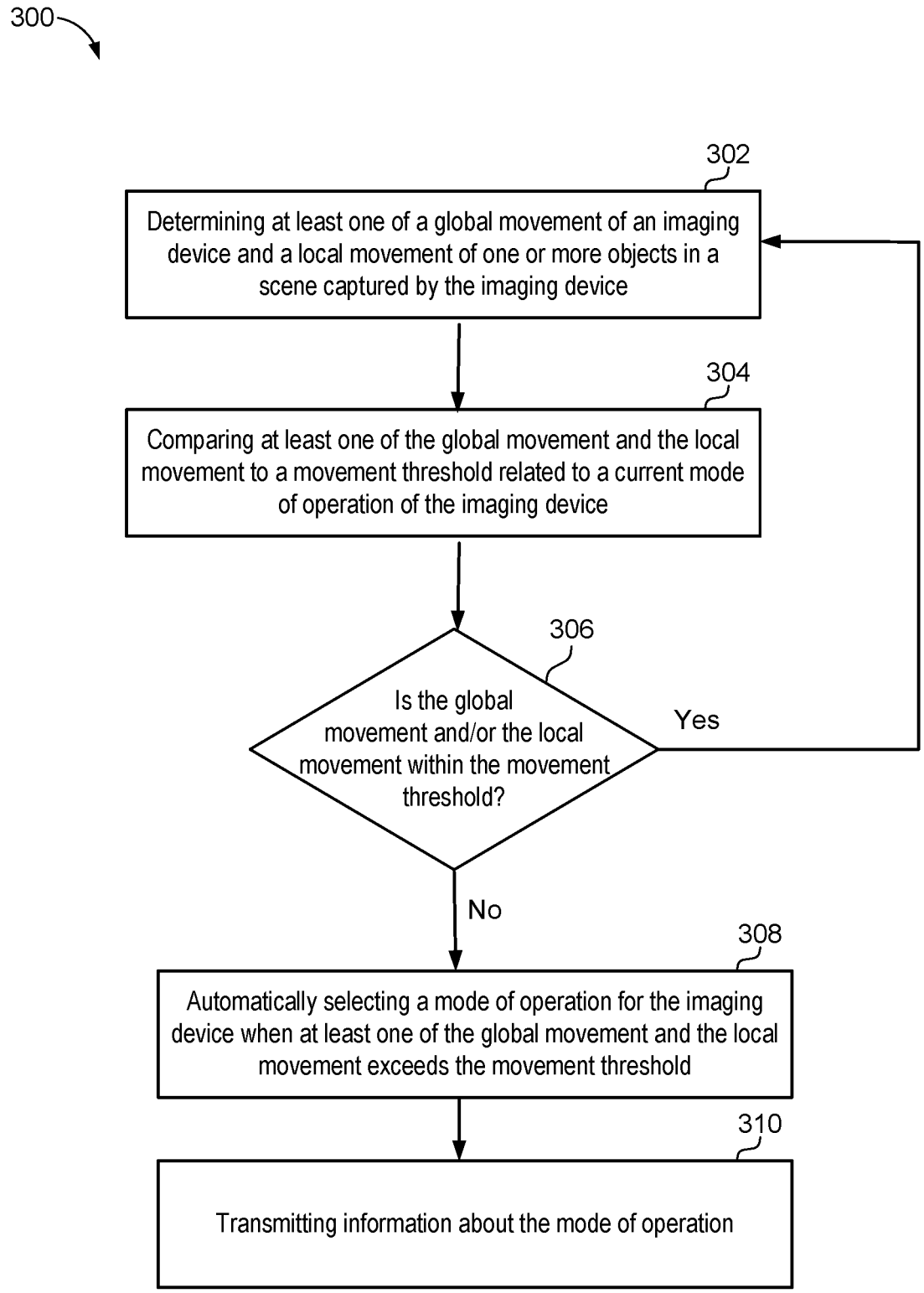
FIG. 3 is an example method flow for compensating for detected motion when capturing an image in accordance with an implementation of the present disclosure.

Referring now to FIG. 3, illustrated is a method 300 that may be used by computer device 102 (FIG. 1) for compensating for detected motion when using an imaging device 104 (FIG. 1) to capture an image of a scene 106 (FIG. 1) by reducing blur in the captured image 19 (FIG. 1).

At 302, method 300 may include determining at least one of a global movement of an imaging device and a local movement of one or more objects in a scene captured by the imaging device. The global movement 34 may include any detected movement of the imaging device 104. For example, movement component 32 (FIG. 1) may receive sensor data 12 (FIG. 1) from one or more sensors 10 (FIG. 1) on imaging device 104. Sensors 10 may include one or more inertial measurement units (IMUs), such as, but not limited to, a gyroscope, an accelerometer, a magnetometer, and/or a global positioning system (GPS). For example, if the hands of a user are moving slightly when holding the imaging device 104, the sensor data 12 may indicate the amount of detected movement for the imaging device 104. Movement component 32 may use the received sensor data 12 to determine a global movement 34 of imaging device 104. In addition, the movement component 32 may analyze the pixels of image frames 18 to determine the global movement 34 of imaging device 104. As such, the global movement 34 may be based on the amount of detected movement by one or more sensors 10 and/or a pixel analysis of the image frames 18.

In addition, the local movement 31 may include any detected motion in the scene 106 captured by the imaging device 104. For example, a scene analyzer component 28 may analyze the pixels in a preview image 17 and determine whether any objects 20 are moving in the scene 106 and/or a location of the detected movement. The scene analyzer component 28 may use a variety of motion detection and motion estimation methods to detect motion of scene 106, including, but not limited to, block-matching methods, phase correlation methods, frequency domain methods, pixel recursive methods, and/or optical flow based approaches. In an implementation, scene analyzer component 28 may use the global movement 34 estimate, when available as a starting point for determining the local movement 31 and may refine locally through pixel analysis. For the purposes of camera mode selection, high precision motion estimation may not be needed. As such, the motion analysis may not be performed each frame, and may be performed infrequently, e.g., five times a second. Moreover, lower resolution frames may be analyzed by scene analyzer component 28 when performing the motion analysis instead of full fidelity input frames.

The scene analyzer component 28 may further determine where movement may be acceptable in an image. For example, movement in peripheral areas of the image may be acceptable, while movement in the center of the image may be undesirable. In addition, the scene analysis may determine whether the image is being captured in a low lighting condition and/or can benefit from high dynamic range imaging. As such, the scene analyzer component 28 may determine the local movement 31 of the preview image 17 based on the detected movement of the scene 106 and/or the lighting conditions of the scene 106.

At 304, method 300 may include comparing at least one of the global movement and the local movement to a movement threshold related to a current mode of operation of the imaging device. The movement threshold 39 may identify an amount of movement that may occur before a captured image 19 becomes blurry using a current mode of operation of an imaging device 104. The movement threshold 39 may vary and may be modified for a targeted system and/or for a desired outcome. For example, evaluator component 36 may compare the global movement 34 of the imaging device 104 (e.g., a degree of hand jitter) to the movement threshold 39. Evaluator component 36 may also compare the local movement 31 to the movement threshold 39. In addition, evaluator component 36 may compare both the global movement 34 and/or the local movement 31 (e.g., motion detected in the captured scene 106) to the movement threshold 39.

In addition, evaluator component 36 may evaluate the lighting conditions 29 when comparing the global movement 34 and/or the local movement 31 to the movement threshold 39. For example, evaluator component 36 may detect the presence and/or absence of flash when capturing the image. In addition, evaluator component 36 may evaluate whether the image is being captured in a low light condition or a bright light condition.

At 306, method 300 may include determining whether the global movement and/or the local movement are within the movement threshold. For example, evaluator component 36 may determine whether the global movement 34 and/or the local movement 31 are within a movement threshold 39 for the current mode of operation of the imaging device 104. The movement threshold 39 may allow for a minimum amount of movement before a captured image 19 may become blurry using the current shutter speed 15. For example, a hand jitter of a few degrees (e.g., a rotation of within 5 degrees per second) may be treated as no movement or noise, while rotations of 6 to 24 degrees per second may be treated as moderate movement, while rotations of higher than 25 degrees per second may be treated as large movement. In one implementation, local movements 31 of less than 3% of region dimension (tile width or tile height) per second may be considered no movement, local movements 31 of 4-7% of region dimension per second may be treated as moderate movement, while local movements 31 more than 8% per second may be treated as large movements. Similar scales may be used for global translational movements of imaging device 104.

Evaluator component 36 may evaluate the area of motion detected for the global movement 34 and/or the local movement 31 in comparison to the whole image frame when comparing the detected motion to the movement threshold 39. For example, if the area of motion is small relative to the whole image frame, the detected motion may be treated as no movement or noise or a small amount of movement. If the area of motion is relatively large compared to the whole image frame, the detected motion may be treated as large movement. In addition, evaluator component 36 may evaluate the lighting conditions 29 when comparing the global movement 34 and/or the local movement 31 to the movement threshold 39. For example, evaluator component 36 may detect the presence and/or absence of flash when capturing the image. In addition, evaluator component 36 may evaluate whether the image is being captured in a low light condition or a bright light condition.

One example may include evaluator component 36 determining whether the global movement 34 and/or the local movement 31 are within a movement threshold 39 for the current shutter speed 15 of imaging device 104. Another example may include evaluator component 36 determining whether the global movement 34 and/or the local movement 31 are within a movement threshold 39 for the current exposure settings of imaging device 104.

If the global movement 34 and/or the local movement 31 are within the movement threshold 39 for the current mode of operation of the imaging device 104, the method may proceed to 302. However, if the global movement 34 and/or the local movement 31 exceed the movement threshold 39 for the current mode of operation of the imaging device 104, the method may proceed to 308.

At 308, method 300 may include automatically selecting a mode of operation for the imaging device when at least one of the global movement and the local movement exceeds the movement threshold. For example, evaluator component 36 may automatically select a mode of operation 43 for the imaging device 104 based on the global movement 34. Evaluator component 36 may also automatically select a mode of operation 43 for the imaging device 104 based on the local movement 31. In addition, evaluator component 36 may automatically select a mode of operation 43 for the imaging device 104 based on both the global movement 34 and the local movement 31.

The mode of operation may include, but is not limited to, a selected shutter speed, a range of exposure, video capture, enabling a flash or screen beacon on imaging device, enabling or determining strength of temporal denoising, and using multi-frame noise reduction methods for photo capture. For example, evaluator component 36 may automatically select a shutter speed 38 for imaging device 104 based on the global movement 34 and/or the local movement 31. The selected shutter speed 38 may be a shutter speed that may produce a clear picture with the detected amount of motion. For example, the selected shutter speed 38 may be a faster shutter speed to compensate for the local movement 31 and/or global movement 34. The slow shutter and fast shutter speed selections provided by evaluator component 36 may be hints given to 3A algorithm (Auto White Balance, Auto Exposure, and Auto Focus) in the camera ISP (Image Signal Processor). The 3A may use the shutter speed hints from the evaluator component 36 to bias decisions within tolerances previously determined.

In addition, evaluator component 36 may automatically select video capture 41 instead of capturing a single frame for the scene 106 based on the global movement 34 and/or the local movement 31. Another example may include evaluator component 36 automatically selecting using a multi-frame noise reduction method for capturing an image 19 based on the global movement 34 and/or the local movement 31.

At 310, method 300 may include transmitting information about the mode of operation. For example, evaluator component 36 may transmit a notification 40 (FIG. 1) with a selected shutter speed 38 (FIG. 1) to a user and/or a camera driver 26 based on the global movement 34 and/or the local movement 31. The notification 40 to the camera driver 26 may include, for example, a proposed shutter speed and a range of exposure. In addition, the notification 40 to the user may include, for example, a warning that motion has been detected, one or more proposed shutter speeds, and/or one or more ranges of exposure for which a user selection may be received for use in taking the picture. In an implementation, evaluator component 36 may also determine that a flash or screen beacon on imaging device 104 should be enabled based on the global movement 34 and/or the local movement 31 so that lighting is improved (and faster shutter speeds would be possible without resulting in objectionable capture noise). As such, the notification 40 may also include an indication to enable a flash or screen beacon on imaging device 104.

Imaging device 104 may receive the selected shutter speed 38 and may use the selected shutter speed 38 to capture an image 19 of scene 106. By using the selected shutter speed 38, the amount of blur in the captured image 19 may be reduced. As such, a crisper image may be produced by imaging device 104.

In an implementation, the mode of operation 43 may include selecting video capture 41 based on the global movement 34 and/or the local movement 31. The movement information, and in particular, the local movement 31, may be used to trigger video recording instead of capturing single frame. Using video capture 41 may produce, for example, "living images", "cliplets", and animated GIFs, that may be more appealing than a blurry single image. As such, notification 40 to the camera driver and/or the user may include the proposed video capture 41 mode of operation. Imaging device 104 may automatically switch to a video capture mode instead of a single image capture mode upon receiving notification 40.

Figure 4:
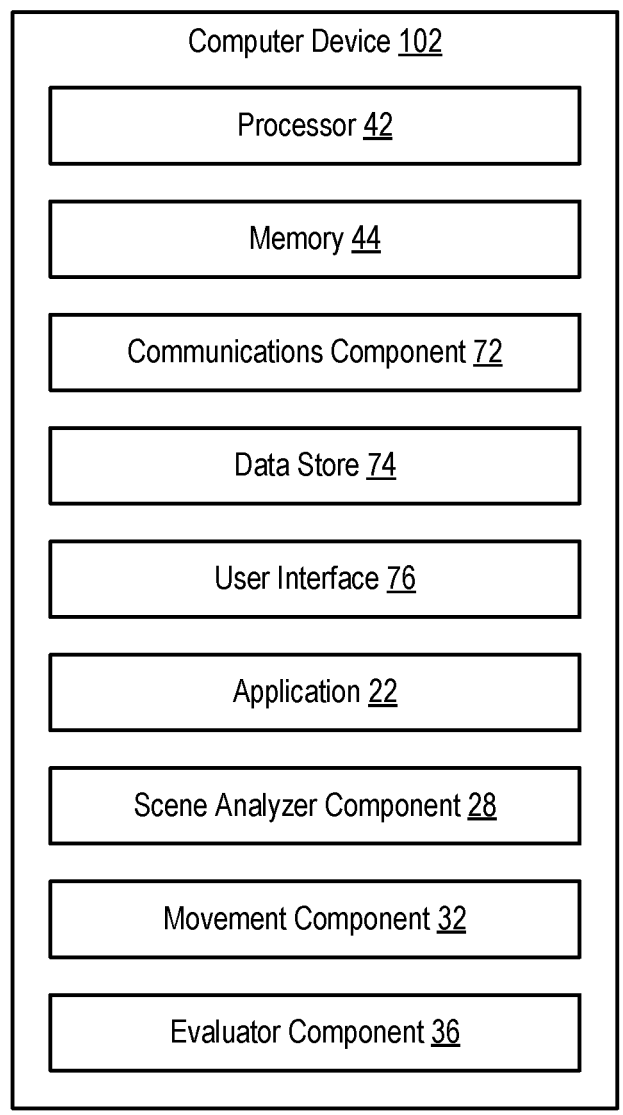
FIG. 4 is a schematic block diagram of an example device in accordance with an implementation of the present disclosure.

Referring now to FIG. 4, illustrated is an example computer device 102 in accordance with an implementation, including additional component details as compared to FIG. 1. In one example, computer device 102 may include processor 42 for carrying out processing functions associated with one or more of components and functions described herein. Processor 42 can include a single or multiple set of processors or multi-core processors. Moreover, processor 42 can be implemented as an integrated processing system and/or a distributed processing system.

Computer device 102 may further include memory 44, such as for storing local versions of applications being executed by processor 42. Memory 44 can include a type of memory usable by a computer, such as random access memory (RAM), read only memory (ROM), tapes, magnetic discs, optical discs, volatile memory, non-volatile memory, and any combination thereof. Additionally, processor 42 and memory 44 may include and execute operating system 110 (FIG. 1).

Further, computer device 102 may include a communications component 72 that provides for establishing and maintaining communications with one or more parties utilizing hardware, software, and services as described herein. Communications component 72 may carry communications between components on computer device 102, as well as between computer device 102 and external devices, such as devices located across a communications network and/or devices serially or locally connected to computer device 102. For example, communications component 72 may include one or more buses, and may further include transmit chain components and receive chain components associated with a transmitter and receiver, respectively, operable for interfacing with external devices.

Additionally, computer device 102 may include a data store 74, which can be any suitable combination of hardware and/or software, that provides for mass storage of information, databases, and programs employed in connection with implementations described herein. For example, data store 74 may be a data repository for applications 22 (FIG. 1), scene analyzer component 28 (FIG. 1), movement component 32 (FIG. 1), and/or evaluator component 36 (FIG. 1).

Computer device 102 may also include a user interface component 76 operable to receive inputs from a user of computer device 102 and further operable to generate outputs for presentation to the user. User interface component 76 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 76 may include one or more output devices, including but not limited to a display, a speaker, a haptic feedback mechanism, a printer, any other mechanism capable of presenting an output to a user, or any combination thereof.

In an implementation, user interface component 76 may transmit and/or receive messages corresponding to the operation of applications 22, scene analyzer component 28, movement component 32, and/or evaluator component 36. In addition, processor 42 executes applications 22, scene analyzer component 28, movement component 32, and/or evaluator component 36 and memory 44 or data store 74 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory; and
   an operating system in communication with the memory and the processor, wherein the operating system is operable to:
   determine a global movement of an imaging device and a local movement of one or more objects in a scene captured by the imaging device, wherein the global movement is used as a starting point in determining the local movement of the one or more objects in the scene, wherein the local movement is a weighted sum of motions detected in regions of the scene using weights that are based on a location of a corresponding region of each of the motions relative to a center of the scene;
   compare at least one of the global movement and the local movement to a movement threshold related to a current mode of operation of the imaging device;
   automatically switch from capturing a single image frame of the scene to a video recording mode of operation for the imaging device in response to at least one of the global movement and the local movement exceeding the movement threshold; and
   transmit information about the video recording mode of operation.

2. The computer device of claim 1, wherein the operating system is further operable to:
   select a mode of operation of the imaging device including one or more of a shutter speed, a range of exposure, enabling a flash on the imaging device, enabling a screen beacon on the imaging device, enabling or determining strength of temporal denoising, and using multi-frame noise reduction methods for photo capture.

3. The computer device of claim 1, wherein the current mode of operation is a current shutter speed and wherein the operating system is further operable to:
   compare at least one of the global movement and the local movement to the movement threshold related to the current shutter speed of the imaging device, and
   wherein the video recording mode of operation is automatically selected in response to the global movement or the local movement exceeding the movement threshold.

4. The computer device of claim 1, wherein the operating system is further operable to determine the local movement of the one or more objects by performing a scene analysis of one or more pixels of an image frame of the scene.

5. The computer device of claim 4, wherein the scene analysis further comprises:
   partitioning the image frame of the scene into a plurality of sections;
   determining whether the motions are detected in the plurality of sections;
   identifying at least one section of the plurality of sections where the motions are detected in response to the motions being detected; and
   applying the weights to the motions based on the location of the at least one section where the motions are detected.

6. The computer device of claim 1, wherein the video recording mode of operation is further selected based on a lighting condition of the scene.

7. The computer device of claim 1, wherein the global movement is based on one or more of sensor data received from at least one sensor on the imaging device and a pixel analysis of received image frames.

8. The computer device of claim 1, wherein the video recording mode of operation is transmitted to the imaging device to use in response to capturing the scene.

9. The computer device of claim 1, wherein the operating system is further operable to determine the local movement of the one or more objects in the scene by using the global movement as the starting point and further using a pixel analysis of one or more pixels of an image frame of the scene to determine the local movement.

10. The computer device of claim 1, wherein the operating system is further operable to determine the local movement of the one or more objects in the scene by using a pixel analysis of a lower resolution representation of an image frame of the scene compared to a higher resolution of the image frame captured by the imaging device.

11. The computer device of claim 1, wherein the operating system is further operable to compare at least one of the global movement and the local movement to the movement threshold by evaluating an area of motion detected for the global movement and the local movement relative to an entire area for the single image frame and determine that at least one of the global movement and the local movement exceeds the movement threshold in response to the area of the motion exceeding a percentage of the entire area.

12. A method for compensating for detected motion in response to capturing an image, the method comprising:
   determining, by an operating system on a computer device, a global movement of an imaging device and a local movement of one or more objects in a scene captured by the imaging device, wherein the global movement is used as a starting point in determining the local movement of the one or more objects in the scene, wherein the local movement is a weighted sum of motions detected in regions of the scene using weights that are based on a location of a corresponding region of each of the motions relative to a center of the scene;
   comparing at least one of the global movement and the local movement to a movement threshold related to a current mode of operation of the imaging device;
   automatically switching from capturing a single image frame of the scene to a video recording mode of operation for the imaging device in response to at least one of the global movement and the local movement exceeding the movement threshold; and
   transmitting information about the video recording mode of operation.

13. The method of claim 12, further comprising:
   selecting a mode of operation of the imaging device including one or more of a shutter speed, a range of exposure, enabling a flash on the imaging device, enabling a screen beacon on the imaging device, enabling or determining strength of temporal denoising, and using multi-frame noise reduction methods for photo capture.

14. The method of claim 12, wherein the current mode of operation is a current shutter speed; and
   the method further comprising:
   comparing at least one of the global movement and the local movement to the movement threshold related to the current shutter speed of the imaging device, and wherein the video recording mode of operation is automatically selected in response to the global movement or the local movement exceeding the movement threshold.

15. The method of claim 12, wherein determining the local movement of the one or more objects further comprises performing a scene analysis of one or more pixels of an image frame of the scene.

16. The method of claim 15, wherein the scene analysis further comprises:
   partitioning the image frame of the scene into a plurality of sections;
   determining whether the motions are detected in the plurality of sections;
   identifying at least one section of the plurality of sections where the motions are detected in response to the motions being detected; and
   applying the weights to the motions based on the location of the at least one section where the motions are detected.

17. The method of claim 12, wherein the video recording mode of operation is further selected based on a lighting condition of the scene.

18. The method of claim 12, wherein the global movement is based on one or more of sensor data received from at least one sensor on the imaging device and a pixel analysis of received image frames.

19. The method of claim 12, wherein the video recording mode of operation is transmitted to the imaging device to use in response to capturing the scene.

20. A non-transitory computer-readable medium storing instructions executable by a computer device, comprising:
   at least one instruction for causing the computer device to determine a global movement of an imaging device and a local movement of one or more objects in a scene captured by the imaging device, wherein the global movement is used as a starting point in determining the local movement of the one or more objects in the scene, wherein the local movement is a weighted sum of motions detected in regions of the scene using weights that are based on a location of a corresponding region of each of the motions relative to a center of the scene;
   at least one instruction for causing the computer device to compare at least one of the global movement and the local movement to a movement threshold related to a current mode of operation of the imaging device;
   at least one instruction for causing the computer device to automatically switch from capturing a single image frame of the scene to a video recording mode of operation for the imaging device in response to at least one of the global movement and the local movement exceeding the movement threshold, wherein a selected mode of operation reduces blur in the scene; and
   at least one instruction for causing the computer device to transmit information about the video recording mode of operation.

* * * * *